United States Patent
Roman (10) Patent No.: US 9,405,749 B2
(45) Date of Patent: *Aug. 2, 2016

(54) METHODS AND DATA STRUCTURES FOR IMPROVED SEARCHABLE FORMATTED DOCUMENTS INCLUDING CITATION AND CORPUS GENERATION

(71) Applicant: Kendyl A Roman, Sunnyvale, CA (US)

(72) Inventor: Kendyl A Roman, Sunnyvale, CA (US)

(*) Notice: Subject to any disclaimer, the term of this patent is extended or adjusted under 35 U.S.C. 154(b) by 498 days.

This patent is subject to a terminal disclaimer.

(21) Appl. No.: 13/872,907

(22) Filed: Apr. 29, 2013

(65) Prior Publication Data

US 2014/0324894 A1    Oct. 30, 2014

Related U.S. Application Data (63) Continuation of application No. 12/586,130, filed on Sep. 16, 2009, now Pat. No. 8,433,708.

(60) Provisional application No. 61/192,169, filed on Sep. 16, 2008.

(51) Int. Cl.
*G06F 17/30* (2006.01)

(52) U.S. Cl.
CPC ............................. *G06F 17/30011* (2013.01)

(58) Field of Classification Search
CPC .............................................. G06F 17/30011
USPC ............... 707/736, 741, 753, 999.1, 999.101, 707/999.102; 382/181, 182
See application file for complete search history.

(56) References Cited

U.S. PATENT DOCUMENTS

| | | | |
|---|---|---|---|
| 6,199,042 B1* | 3/2001 | Kurzweil | 704/260 |
| 2003/0200505 A1* | 10/2003 | Evans | 715/507 |
| 2005/0210008 A1* | 9/2005 | Tran et al. | 707/3 |

* cited by examiner

*Primary Examiner* — Hares Jami (57) ABSTRACT

Computer searchable annotated formatted documents are produced by correlating documents stored as a photographic or scanned graphic representations of an actual document (evidence, report, court order, etc.) with textual version of the same documents. A produced document will provide additional details in a computer data structure that supports citation annotation as well as other types of analysis of a document. The computer data structure also supports generation of citation reports and corpus reports. A computer method of creating searchable annotated formatted documents including citation and corpus reports by correlating and correcting text files with photographic or scanned graphic of the original documents. Data structures for correlating and correcting text files with graphic images. Generation of citation reports, concordance reports, and corpus reports. Data structures for citation reports, concordance reports, and corpus reports generation.

20 Claims, 8 Drawing Sheets

| Relative | | | Citation | | | | | | Part | Section | Text for Sentences | Doc ID |
|---|---|---|---|---|---|---|---|---|---|---|---|---|
| Para# | Sent# | New Para | Citation Start | | | Citation End | | | | | | |
| | | | Col# | Line# | Word# | Col# | Line# | Word# | | | | |
| 92 → | | | | | | | | | E.g. Abstract Specification Drawings Claims | E.g. Background Description of Figs Detail Description | | |
| 94 → | | | Fig Claim | Item Clause | | | | | | | | |
| 96 → | | | | | | | | | | | | |
| | | | | | | | | | | | | |
| | | | | | | | | | | | | |

| Page# | Column# | Line# | Line Coordinates | | | | New Para. | Font Size | Text |
|---|---|---|---|---|---|---|---|---|---|
| | | | Top | Bottom | Left | Right | | | |
| | | | | | | | | | |
| | | | | | | | | | |

Corpus for "Video" in
U.S. Patent 7,016,417

| Prior Context | Word | Subsequent Context | Citation |
|---|---|---|---|
| General purpose compression for | video | Images (RHN) | '417 Patent Title |
| Methods, medium, and machines which compress, encode enhance, transmit, decompress, and display displayable | video | , categories of interest and the user's display preferences of each category. | '417 Abstract s.1 |
| 4. provides a scalable means of | video | compression. | '417 Patent 20:17 |

United States Patent 7,016,417 with Pat2Cite™ Citations

Summary
United States Patent 7,016,417, Roman; Kendyl A., entitled "General purpose compression for video images (RHN)," filed December 22, 1999, issued March 21, 2006, (the "'417 Patent")

Title
General purpose compression for video images (RHN) ('417 Title)

Abstract
Methods, medium, and machines which compress, encode, enhance, transmit, decompress and display digital video images in real time. ('417 Abstract, s. 1)

Real time compression is achieved by sub-sampling each frame of a video signal, encoding and filtering the pixel values to codes, and run-length encoding the codes. ('417 Abstract, s. 2)

Real time transmission is achieved due to high levels of effective compression. ('417 Abstract, s. 3)

Real time decompression is achieved by decoding and decompressing the encoded data to display high quality images. ('417 Abstract, s. 4)

High levels of effective compression also reduce the storage space requirement for recorded video. ('417 Abstract, s. 5)

Written Description
GENERAL PURPOSE COMPRESSION FOR VIDEO IMAGES (RHN) ('417 1:1-2)
CROSS-REFERENCE TO RELATED ('417 1:4-4)
APPLICATIONS ('417 1:5-5)

Also, the processes can each be implemented as a hardware apparatus that will improve the performance significantly. ('417 20:58-59)

Thus the scope of the invention should be determined by the appended claims and their legal equivalents, and not solely by the examples given. ('417 20:60-62)

Fig. 8B

METHODS AND DATA STRUCTURES FOR IMPROVED SEARCHABLE FORMATTED DOCUMENTS INCLUDING CITATION AND CORPUS GENERATION

RELATED APPLICATION

This application claims priority under 35 U.S.C. §199(e) of the U.S. provisional application Ser. No. 61/192169, filed Sep. 16, 2008, entitled "METHODS AND DATA STRUCTURES FOR IMPROVED SEARCHABLE FORMATTED DOCUMENTS INCLUDING CITATION AND CORPUS GENERATION," which is hereby incorporated by reference.

FIELD OF THE INVENTION

This invention relates to improved searchable formatted electronic documents and analysis tools, such as citation and corpus generation. Examples of documents include patents, patent applications, evidence files, and other documents which are available in graphic form and optionally also available in a text form.

BACKGROUND OF THE INVENTION

In the field of electronic document management there are many situations where a document is stored electronically on a computer system as a photographic or scanned graphic of the actual document. For example, in a litigation document management system example documents may represent evidence, reports, court orders, patent documents, etc. The graphic image of the page is critical in many cases and needs to be preserved. However, there is also a need to electronically search the document using a computer. Additionally, there has been a long felt need to be able to cut the text from a document and have an accurate internal citation, or location identification, automatically pasted into a new document (e.g. report, brief, etc.) with the text that was cut. In litigation, having analysis, reports, and arguments error free is very important and a significant amount of time spent creating quotes and internal citations and then in checking them to ensure accuracy.

What is needed is a way to analyze documents in its graphic format and then be able to generate quotations with accurate internal citations using a computer. Also in patent analysis, for example, what also is needed is a way to thoroughly review all occurrences of certain terms in context to be able to thoroughly and accurately determine the meaning of those terms.

SUMMARY OF THE INVENTION

The current invention provides the ability to produce computer searchable annotated formatted documents by correlating documents stored as a photographic or scanned graphic representations of an actual document (evidence, report, court order, etc.) with textual version of the same documents. A produced document will provide additional details using computer data structure(s) that would support the above described citation annotation as well as other types of analysis of a document. The data structure(s) also support computer generation of citation and corpus reports.

Objects and Advantages

Accordingly, beside the objects and advantages described above, some additional objects and advantages of the present invention are:

1. To provide a quicker and more effective method analyzing documents.
2. To provide a highly accurate, electronically searchable document from graphic images of the document pages.
3. To provide means and methods of document analysis that are easy to use.
4. To reduce the cost of document analysis.
5. To reduce the cost of evidence analysis.
6. To improve the thoroughness of documents analysis.
7. To improve the thoroughness of patent claim term analysis.
8. To identify inconsistencies in the use of document terms, e.g. usage of disputed patent claim terms.

BRIEF DESCRIPTION OF THE DRAWINGS

FIG. 8B illustrates an embodiment of a citation report.

REFERENCE NUMERALS IN DRAWINGS

| | |
|---|---|
| 1 | local computer |
| 2 | network |
| 3 | remote computer |
| 4 | network accessible file collection |
| 5 | converted file |
| 6 | output device |
| 10 | graphic images |
| 20 | text file |
| 30 | formatted document |
| 40 | searchable formatted document |
| 50 | corrected formatted document |
| 60 | searchable annotated formatted document |
| 62 | parse routine |
| 64 | correlate and correct routine |
| 66 | attach data routine |
| 68 | tag words and sentences routine |
| 71 | relative fields |
| 72 | citation fields |
| 73 | part fields |
| 74 | section fields |
| 75 | text for sentences fields |
| 76 | doc ID field |
| 80 | text field |
| 81 | sequential paragraph number |
| 82 | sequential sentence number |
| 83 | new paragraph start |
| 84 | citation start column # field |
| 85 | citation start line # field |
| 86 | citation start word # field |
| 87 | citation end column # field |
| 88 | citation end line # field |

-continued

| | |
|---|---|
| 89 | citation end word # field |
| 90 | part field |
| 91 | section field |
| 92 | specification part |
| 98 | doc ID field |
| 102 | OCR page # |
| 104 | OCR column # |
| 106 | OCR line # |
| 108 | OCR line coordinates |
| 110 | OCR new paragraph start |
| 112 | OCR line font size |
| 114 | OCR line text |
| 116 | OCR line top coordinate |
| 118 | OCR line bottom coordinate |
| 120 | OCR line left coordinate |
| 122 | OCR line right coordinate |
| 200 | data structure(s) |
| 200 a | first (text) data structure |
| 200 b | second (meta-data) data structure |
| 302 | read text |
| 304 | determine document parts |
| 306 | determine document sections |
| 308 | determine new paragraphs |
| 310 | determine paragraph types |
| 312 | apply relative numbers to each section |
| 314 | read text output |
| 316 | determine parts output |
| 318 | determine sections output |
| 320 | determine new paragraph output |
| 322 | determine paragraph type output |
| 324 | re-apply relative numbers to each section |
| 326 | read searchable formatted document |
| 328 | assemble lines |
| 330 | allocate lines to columns |
| 332 | calculate line numbers |
| 334 | read searchable formatted document output |
| 336 | assemble lines output |
| 338 | allocate lines to columns output |
| 402 | read text file |
| 404 | read searchable formatted document |
| 406 | match text |
| 408 | determine column line and word values |
| 410 | contains figures? |
| 412 | determine figure # and item # |
| 414 | contains claims? |
| 416 | determine claim and clause # |
| 420 | read text file output |
| 422 | read searchable formatted document output |
| 424 | match text output |
| 426 | determine column line and word values output |
| 428 | determine figure # and item # output |
| 600 | concordance program |
| 602 | concordance |
| 700 | corpus program |
| 702 | word or phrase corpus |
| 710 | prior content column |
| 712 | word (or phrase) column |
| 714 | subsequent content column |
| 716 | citation column |
| 720 | heading row |
| 722 | corpus sample row 1 |
| 724 | corpus sample row 2 |
| 728 | corpus last sample row |
| 800 | citation program |
| 802 | citation document |
| 804 | citation document title |
| 810 (a-d) | citation document section title |
| 812 (a-d) | citation sentence |
| 814 (a-d) | citation annotation |

SPECIAL DEFINITIONS corpus—a collection of recorded statements used as a basis for the descriptive analysis of language in a written document concordance—an index of the important words used in a written document annotation—extra information which is not normally displayed, such as citation information from a data structure that provides citations for text cut from a formatted document

DETAILED DESCRIPTION OF THE INVENTION

Figure 1A:
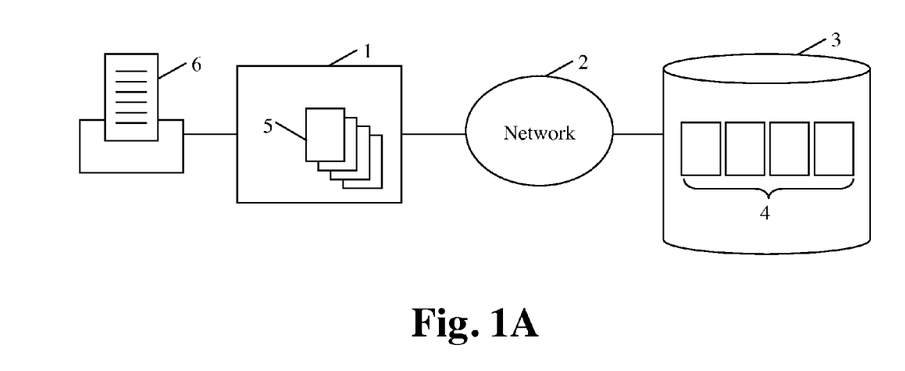
FIG. 1A illustrates a process by which remote documents are obtained and collected and then subsequently converted to other formats.

FIG. 1A illustrates a process by which remote documents are obtained and collected and then subsequently converted to other formats. Local computer 1 connects to a remote computer 3 via a network 2. Then it accesses file data from a network accessible file collection 4 and retrieves the desired files onto the local computer 1 over the network 2. Once on the local computer 1, the files can be converted into a single converted file 5. Once converted, the file can be output to a peripheral device 6, such as a display or a printer (as shown). Peripheral devices 6 are well known to include hard disk drives, floppy disk drives, tape drives, flash drives, CD drives, DVD drives. Peripheral devices 6 are well known to accept various types of computer readable media such as hard disk platters, floppy disks, tapes, memory chips, CDs, DVDs, and similar media. The computer readable medium may store the program instructions that make up a computer software program or routine, computer data, and/or computer data structures.

For example, the United States Patent and Trademark Office (USPTO) has a service (remote computer 3) which provides patent publications as TIFF files, one file for each page.

A patent related embodiment performs the following steps on local computer 1:
 a) Input a patent number
 b) Access the USPTO World Wide Web site (remote computer 3) over the Internet (network 2) to obtain the HTML text version of a patent and to use that HTML to determine the number of pages represented by graphic images (e.g. TIFF)
 c) Download each page's graphic image from the USPTO World Wide Web site (remote computer 3) over the Internet (network 2)
 d) Convert the collection of graphic images into a single document (e.g. PDF or multipart TIFF).
 e) Optically recognize (via OCR) the page graphic images. Alternatively, each page's graphic image can be processed on the fly (e.g. recognized as each is downloaded in step c above).

These steps run on one computer or on a group of computers. These steps could be implemented in computer software. Example embodiments include an Acrobat plug-in or a World Wide Web browser plug-in. Good results have also been obtained implementing these steps as a script running on a group of computers including one computer running an OCR engine (such as OmniPage, TextBridge, or other commercially available OCR engine) and another computer running an Oracle database.

A novel improvement in the system illustrated in FIG. 1A is that an HTML (or plain text) version of the same subject matter can be used to correct spelling in an OCR document created from graphic page images (e.g. using Acrobat OCR capture). For example, in the embodiment for U.S. patents, the USPTO also provides an HTML version of the patent that can be used to correct and correlated the OCR text. It is well known that OCR is not 100% perfect and human comparison and correction is costly. This aspect of the system can significantly improve the value of searchable documents created by OCR.

Once the graphic images are converted (and optionally corrected), the document 5 can be printed, for example on printer 6.

Figure 1B:
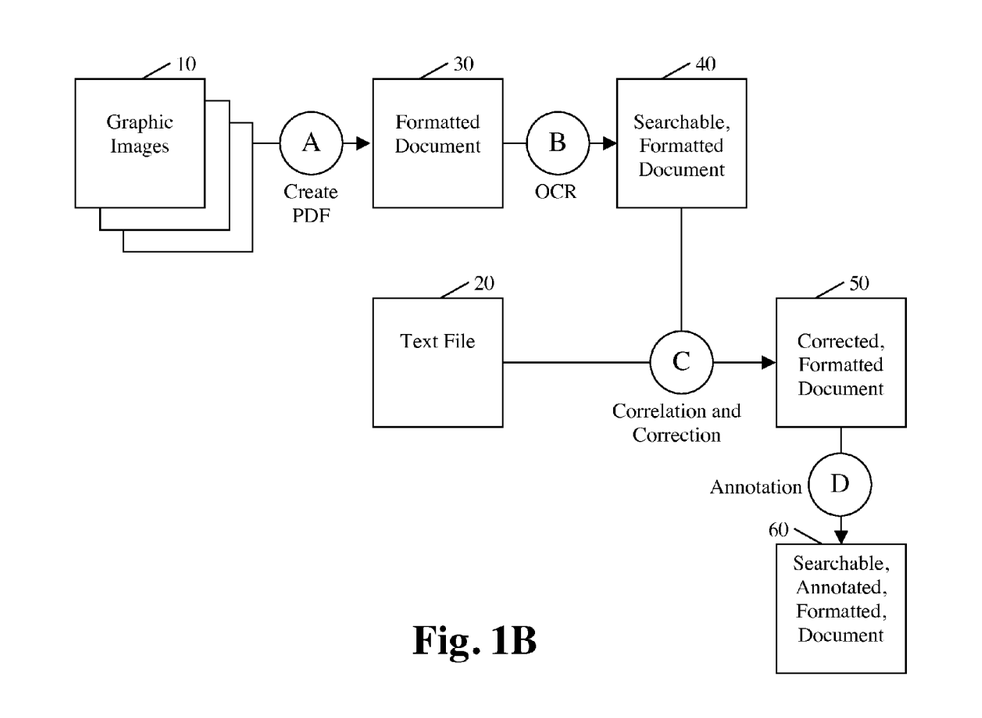
FIG. 1B illustrates a process by which a searchable annotated formatted document is produced.

FIG. 1B illustrates production of a searchable annotated formatted document 60. The U.S. patent example will be used to illustrate this aspect of the system. The USPTO provides a graphic image 10 for each page of a published patent. These graphic images 10 (e.g. TIFF files) are not text searchable (they are like photographs). A formatted document 30, such as an Adobe Acrobat PDF, can be created as a binder holding every graphic image 10 (routine A). See also FIG. 1A. The formatted document 30 (e.g. PDF file) can be processed with OCR (routine B) to convert the images to searchable text forming a searchable formatted document 40. Alternatively, an OCR engine can provide structured data which describes the text elements found in the document with the graphic location of each element, and which can be used instead of searchable formatted document 40. The USPTO also provides a separate and distinct text file 20 in HTML format for many patents. Unlike the graphic images 10 which are not text searchable, the text file 20 is electronically searchable. The searchable formatted document 40 is correlated with the text file 20 to correct the OCR text (routine C) resulting in a corrected formatted document 50.

The corrected formatted document 50 is a valuable tool for analysis.

Further, the corrected formatted document 50 can be used to add various annotations (routine D) to produce a searchable annotated formatted document 60. "Annotated" is not used in the general sense as would be understood by one of skill in the art. The word is used here in a new limited way to refer to the annotations from the data structure(s) 200 that provide the internal citations for quotes pasted from the searchable annotated formatted document 60. Again using the U.S. patent example, the searchable annotated formatted document 60 version of a patent can be used as the primary analysis document in a patent litigation or evaluation. When an expert or attorney wants to refer to a particular section of the patent, the user simply selects the desired words and a highly accurate quote and citation, including for example, column and line numbers, is automatically generated and can be pasted into a report or brief.

Figure 2A:
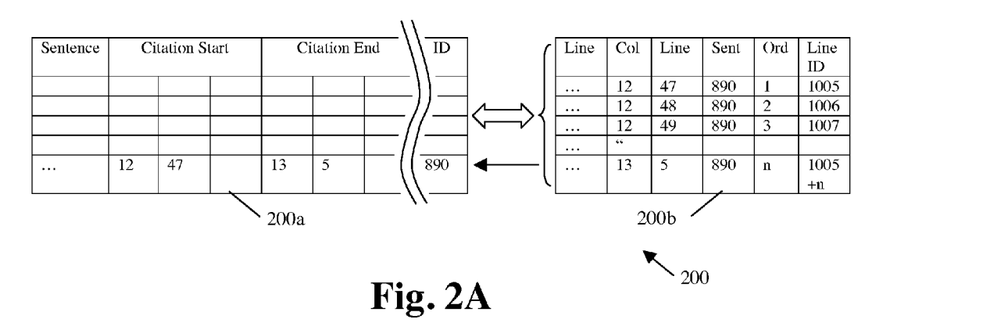
FIG. 2A illustrates data structures that are used to verify, correlate and correct meta-data data, for example, patent OCR data.

FIG. 2A illustrates computer data structures that are used to verify, correlate and correct document data, for example, patent OCR data. The computer data structures 200 can be implemented in various ways. Good results have been obtained by implementing them as Microsoft Excel spreadsheets, perl data structures, XML files, or Oracle database data tables.

The first data structure 200a generally contains each unit with information used to provide an internal citation, e.g. "('498 Patent 12:47-13:5)". An example of a unit would be a sentence or a title. This data is substantially obtained from the HTML (or text version of the document) and may contain estimated values. In one embodiment, a spreadsheet document (such as Microsoft Excel) with functions is used to estimate the citations (to improve correlation ease or accuracy).

The second data structure 200b generally contains each line (or column line). Each column line has only one column and/or line number associated with it. This data preferably comes from OCR data (but may be input by people).

The data between these two structures are correlated with a unique ID for each entry in the tables. The sentence data has an ID for each sentence. The column line data has an ID for each line. The line data is matched, if possible, to each sentence's unique ID and give a sentence a relative ordinal number. The actual citation data, such as start column, start line, end column, and end line, is filled in the first data structure 200a based on matching first and last line data. The OCR text is corrected by verification against the HMTL data. Missing data in the data structure is flagged and estimates are used.

Figure 2B:
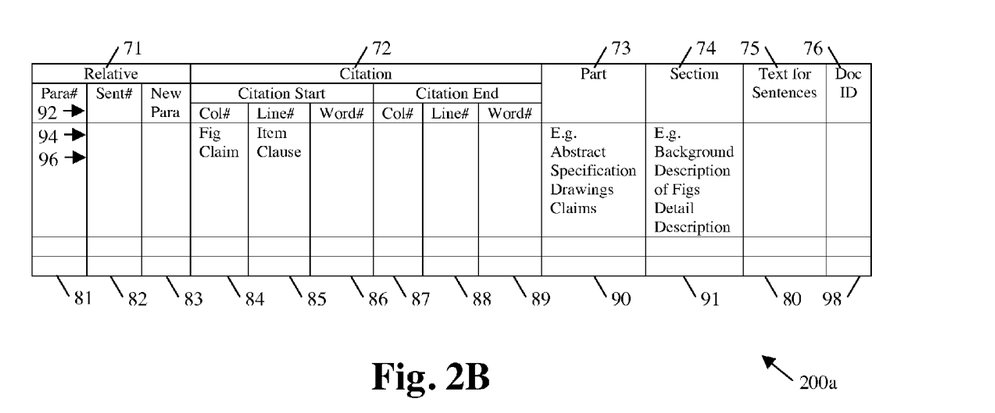
FIG. 2B illustrates an embodiment of a text data structure.

FIG. 2B illustrates an exemplary text data structure 200a that holds information that will be used to provide the citations for quotes pasted from the searchable annotated formatted document 60 or citations on a word or phrase corpus 702. The text data structure 200a also provides an alternative output that can be used independently from the formatted documents (30, 40, 50 or 60). The text data structure 200a is first instantiated by a parsing routine (FIG. 3) and updated by a correlation and correction routine (FIG. 4).

Figure 2C:
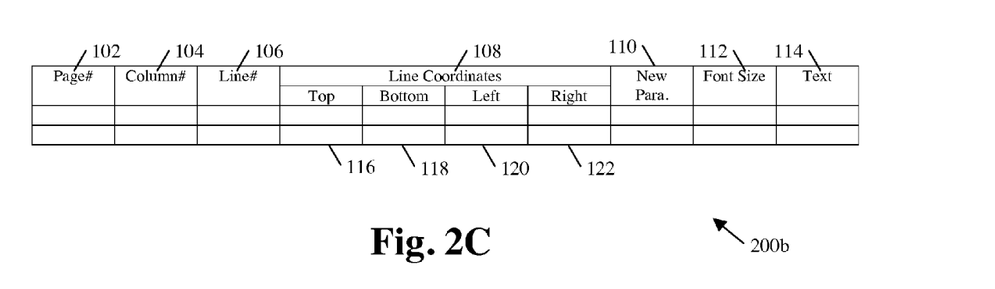
FIG. 2C illustrates an embodiment of a meta-data data structure.

FIG. 2C illustrates an exemplary meta-data data structure 200b that holds information that will be used to as an interim repository for the data parsed from the searchable formatted document 40, or alternatively obtained from OCR.

Figure 3A:
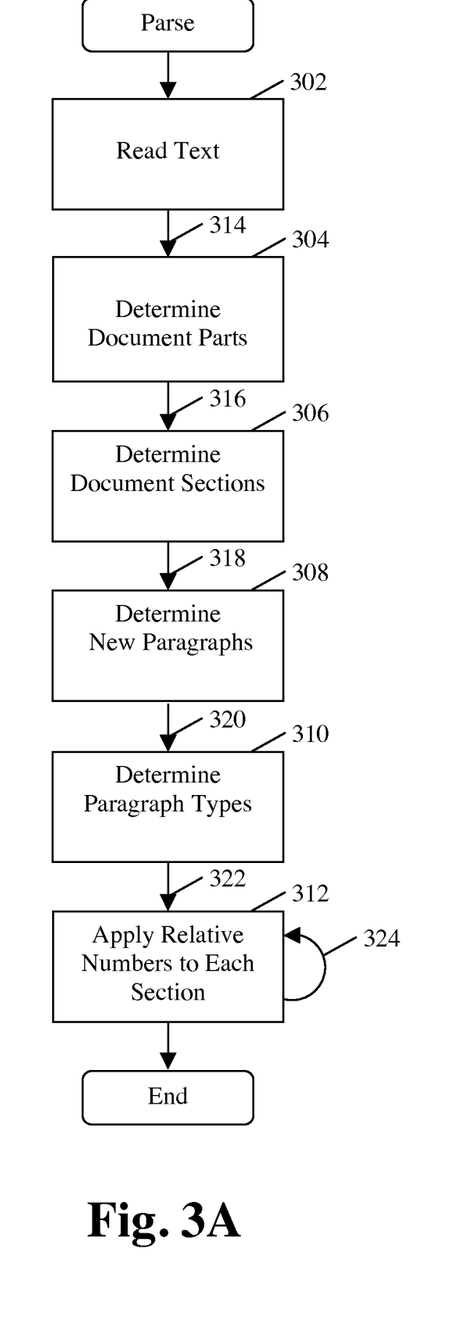
FIG. 3A illustrates a text parse routine.
Figure 4:
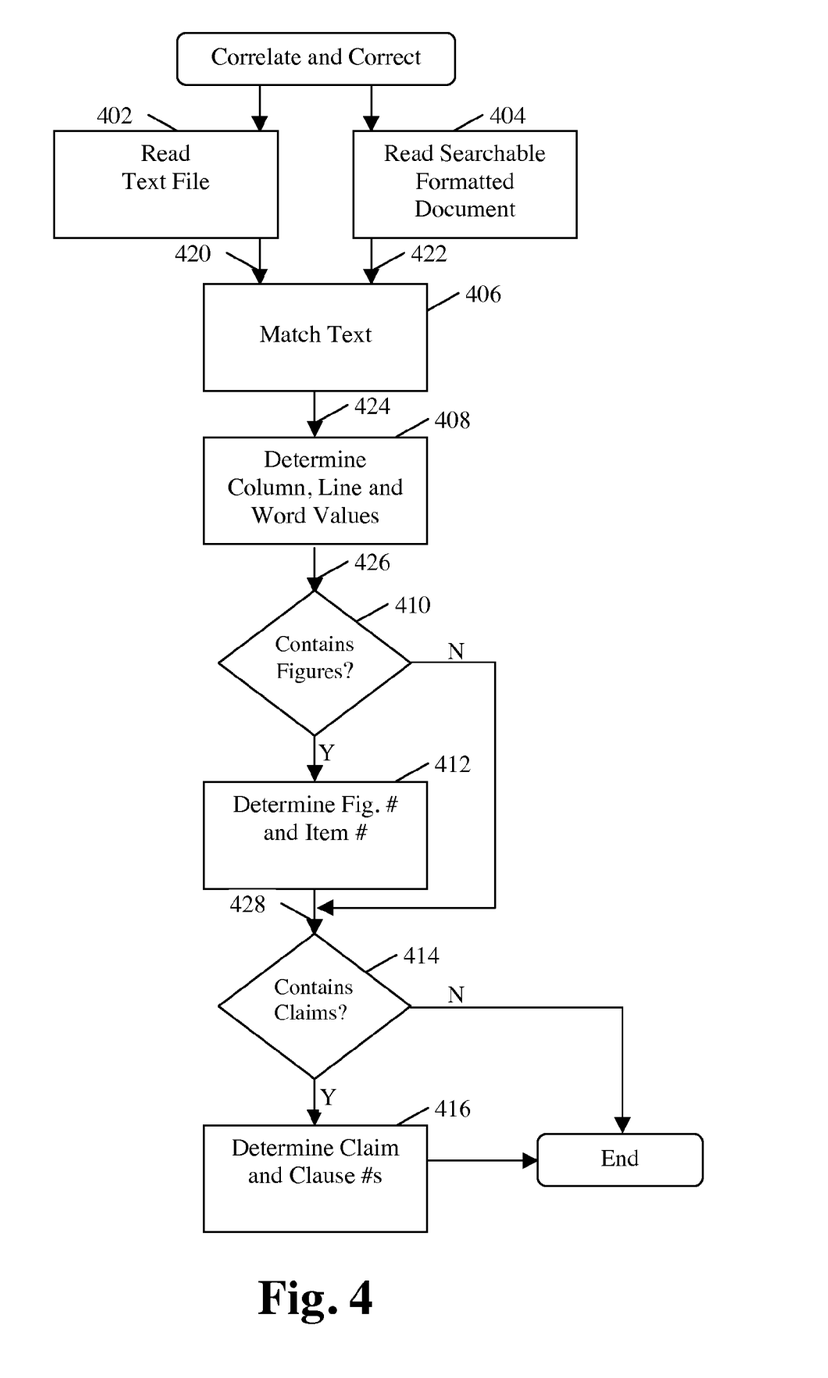
FIG. 4 illustrates a correlate and correct routine.

FIG. 3A illustrates a text parse computer routine (which could be implemented in Perl, for example) which reads the text from the text file 20 or another source of text (step 302). It determines the document parts (step 304). For example, in a U.S. patent embodiment, parts could be one of Abstract, Drawing, Specification, or Claims. Then it determines document sections (step 306). For example, in a U.S. patent embodiment, document sections include Background of the Invention, Summary of the Invention section, and so forth. Then it determines new paragraphs (step 308). Then it determines paragraphs types (step 310). For example, regular paragraph text, tables, equations, etc. In step 312, the text data structure 200a in FIG. 2B would be filled in except for the citation fields (72). The text for each heading or sentence would be filled in the text field (80). Relative numbers would be filled in, for example in the specification part (92), each paragraph would be assigned a sequential paragraph number (81) and sequential sentence number (82). Sentence numbers would restart at 1 for each paragraph. In addition, any new paragraph starts (83) would be identified. In the patent drawings, for example, any text from the figures would be indexed. In the claims, each clause would be relative to the claim. The part fields (73, 90) and the section fields (74, 91) would be filled in.

At this point the text data structure 200a (without the citations) has an alternative use. It can be used to produce a text version of the subject document (e.g. patent) with numbered paragraphs (e.g. for electronic filing) e.g. "[103] Referring to FIG. 1B . . . ."

Figure 3B:
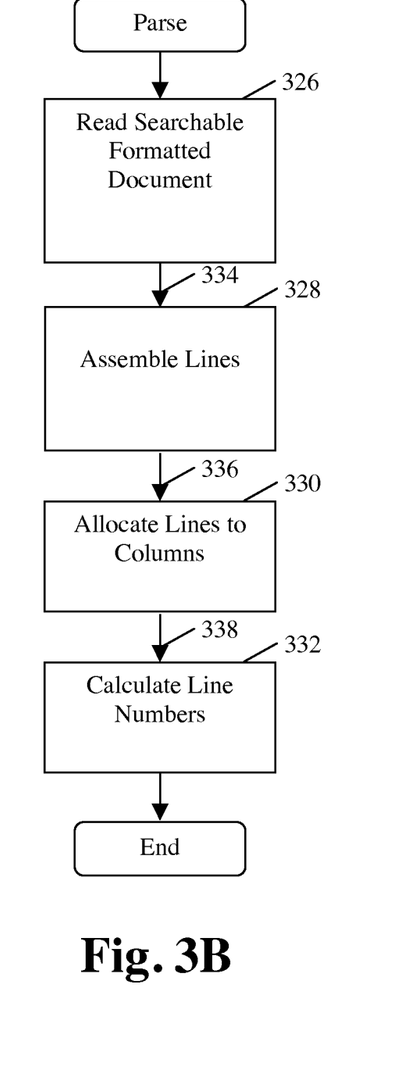
FIG. 3B illustrates a searchable formatted document parse routine.

FIG. 3B illustrates the searchable formatted document parse computer routine (which could be implemented in Perl, for example) which reads the searchable formatted document 40 (step 326). Then it takes the words and assembles the lines (step 328). Then it allocates each line to either the left or right column (step 330). Then it calculates the line numbers for each line (step 332). At this point, the meta-data data structure 200b in FIG. 2C would be filled in completely.

Figure 5:
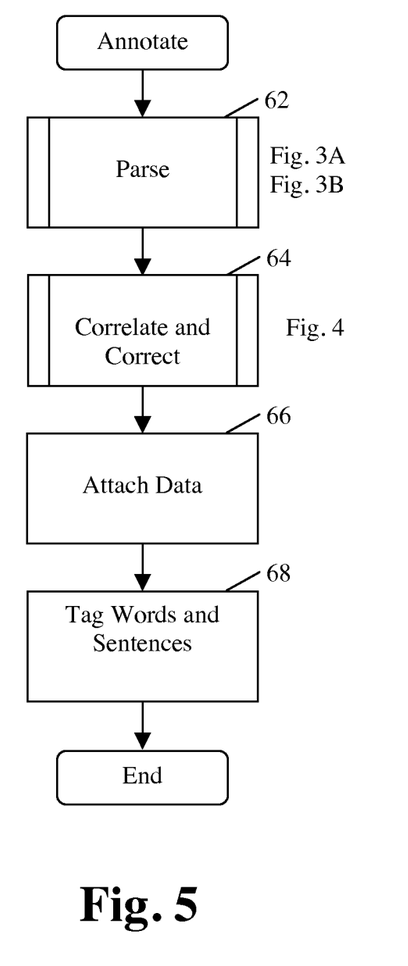
FIG. 5 illustrates an annotation routine.

FIG. 5 illustrates the annotation computer routine which is an implementation of routine D in FIG. 1B. First the text (20 or 50) is parsed by the parse routine 62 (e.g. using the text parse routine shown in FIG. 3A) and the searchable formatted document parse routine (e.g. see FIG. 3B). Next the text data structure 200a is updated with correlation and correction information by the correlate and correct routine 64. For example, see FIG. 4.

The correlation information in the patent example would be the citation column, line and word numbers for the start and end of each sentence. The end could be optional because, for example, it could be determined by looking at the next record's start. The next step is to attach the data (e.g. FIG. 2B) by the attach data routine 66 to the document. In some embodiments, the data would be meta-data that is not normally viewable in normal display modes. In other embodiments, the data in each record could be stored as a user displayable "annotation" (in the general sense) at the user's option. In other embodiments, the data is simply appended to the end of the document e.g. as a table.

Next the words and/or sentences are tagged by the tag words and sentences routine (68) in the formatted document so that when a portion is cut or copied, the citation associated with the text is cut or copied with it. Special software associated with the document viewer would handle the "cut" and/or "copy" operation. For example, in PDF or FrameMaker or Microsoft Word a plug-in could be added (either by the publisher or as a $3^{rd}$ party plug-in) to provide text plus the citation (e.g. "U.S. Pat. No. 8,888,523 17:40-18:3") in the paste buffer.

Note that step 68 in FIG. 5 could be optional because the plug-in could use the attached data (step 66) to provide the citation in the paste buffer. However, by tagging the documents, the determination of the citation for a particular set of words is more straightforward at the time of the cut and/or copy operation.

FIG. 4 illustrates an example of the correlate and correct step 64 of FIG. 5. A text file 20 is read (step 402). A searchable formatted document 40 is read (step 404). The order of steps 402 and 404 is not significant, and may be performed in parallel. In step 406, the text file 20 in the form of the text data structure 200a is compared with a searchable formatted document 40 in the form of the meta-data data structure 200b. The relative text is matched to the positional information in the graphic version of the same document to determine page or column number, line number, and word number (92) or the line (step 408). If the document contains figures (decision 410), then the figure numbers and item numbers (94) are determined in step 412. If the document contains claims (decision 414), then the claim numbers and clause numbers are also determined in step 416. Thus the correlation routine updates the text data structure 200a (FIG. 2B) with the start (and optionally end) citation information 72 (84-89).

Figure 6:
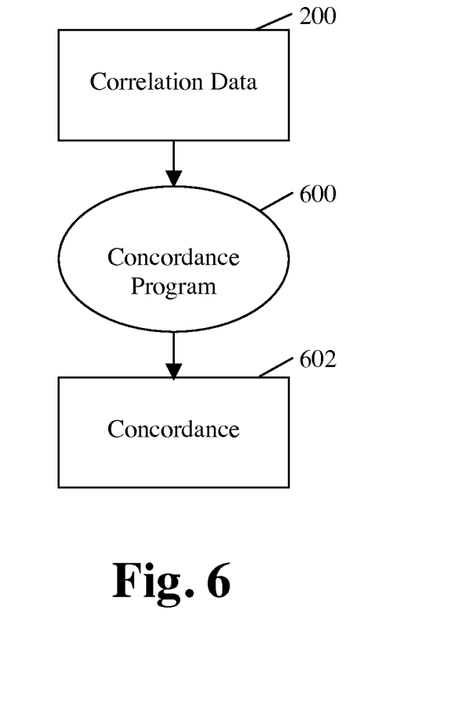
FIG. 6 illustrates generation of a concordance.
Figure 7A:
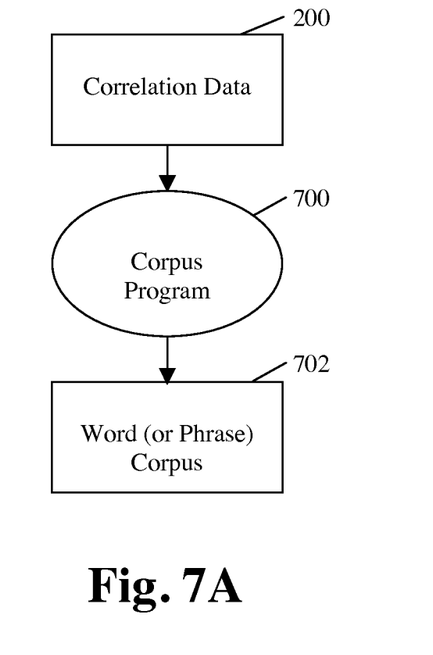
FIG. 7A illustrates generation of a word corpus.
Figure 7B:
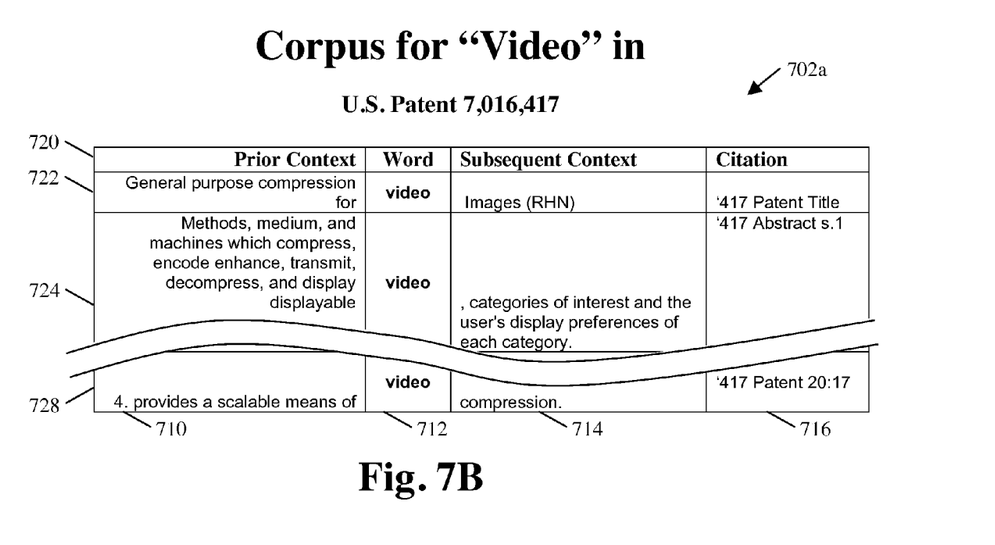
FIG. 7B illustrates an embodiment of word corpus.
Figure 8A:
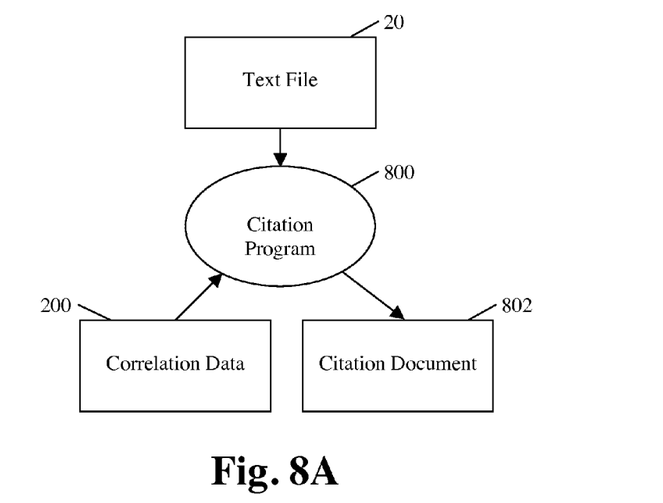
FIG. 8A illustrates the generation of a citation report.

If the document or page has a document ID (e.g. a BATES number), it is added in (76, 98). After the correlate and correct routine (e.g. for example, see FIG. 4) is complete the data structure can be used in many ways including but not limited to:

1. Annotation of the corrected formatted document 50 to form the searchable annotated formatted document 60.
2. Production of a spreadsheet containing each text element and citation where by a reader can find text in the spreadsheet by electronically searching and quickly find the internal citation or location of the text in a paper version.
3. Input to a concordance program 600 that identifies each occurrence of a word or phrase and produces a concordance 602 with each sentence with the specified word or phrase and its citation (FIG. 6).
4. Input to a corpus program 700 that identifies each occurrence of a word or phrase and produces a corpus 702 with each sentence and with the specified word or phrase and its citation (FIG. 7A). FIG. 7B shows an embodiment of word or phrase corpus 702.
5. Input to a citation program 800 that produces a citation document 802 with each sentence and with its citation (FIG. 8A). FIG. 8B shows an embodiment of a citation document 802.

Note the word "corpus" generally means "entire body." In the context of the field of language analysis it refers to a collection of recorded utterances used as a basis for the descriptive analysis of a language. In the context of this invention the word "corpus" (as well as "concordance") is limited to the language used in a single document (e.g. a patent) or a small group of related documents (e.g. a set of related patents with common inventorship or subject matter).

The corpus 702 could be corpus for a single word or phrase i.e. a "word corpus" or for all the words in the document i.e. a "document corpus" or for a set of key words (e.g. a) similar to those selected for a concordance, or b) a set of disputed terms). This invention is not limited to patent analysis. It is also useful for analysis of other evidence, such as e-mail, source code, contracts, discovery documents, Web pages, contracts, etc.

The methods for:
generating a corrected formatted document 50 (e.g. FIG. 1B),
generating a searchable annotated formatted document 60 (e.g. FIG. 1B),
generating a concordance 602 (e.g. FIG. 6),
generating a corpus 702 (e.g. FIG. 7A), and
generating a citation document 802 (e.g. FIG. 8A),
can each be implemented on a web site computer enabled by a database for storing the correlation data and various generated documents.

ADVANTAGES

Searchable
Text searches can be performed within the document or across multiple documents.
Copy and Paste Citation
Each sentence in the document can be copied and pasted into other documents. The internal citation for each sentence (or group of sentences) is copied and pasted along with the sentence.
Original Document Format Maintained
The original format of the document is maintained after it has been converted to a searchable format.
Identify Location in Original Document
As formats in the text file 20 may differ from the original formatted document 30, it is important that the annotations or citations correlate with each sentence and/or line and/or heading to identify its relative location with a document.
Accuracy
Optical Character Recognition (OCR) systems have struggled for decades to improve accuracy. OCR does very poorly on some documents. Further, for some situations, such as an expert witness report or Federal Court brief, errors can have severe impact on the perception of the facts in the case and ultimately cost millions of dollars. The present invention provides a way to improve accuracy of the computer generated data as well as improve the accuracy of human construction of reports and briefs.
Thorough
The concordance and corpus features of present invention provide a means for through analysis of every instance of a word or phase, or related phrases, in a document of related set of documents. For example, in a patent case, the corpus documents on disputed claim terms will not only make claim term analysis more efficient, but will also ensure that all usage is considered and inconsistencies are understood. The use of corpus reports will improve the rigorousness of claim term analysis and provide judges with stronger input upon which to base their judgments.

Cost Saving

The present invention provides several aspects that will save time and improve the performance of highly paid experts, analysis, and attorneys. Thus, significant savings will result from use of the present invention.

Conclusion, Ramification, and Scope

Accordingly, an aspect of the present invention provides searchable annotated formatted documents that are produced by correlating documents stored as a photographic or scanned graphic representations of an actual document (evidence, report, court order, etc.) with textual version of the same documents. A produced document will provide additional details in a data structure that supports citation annotation as well as other types of analysis of a document. The data structure also supports generation of citation reports and corpus reports. A method aspect includes creating searchable annotated formatted documents including citation and corpus reports by correlating and correcting text files with photographic or scanned graphic of the original documents. Data structures for correlating and correcting text files with graphic images are valuable output by themselves. Another method aspect includes generation of citation reports, concordance reports, and corpus reports. Data structures provide for citation reports, concordance reports, and corpus reports generation.

While the above descriptions contain several specifics these should not be construed as limitations on the scope of the invention, but rather as examples of some of the preferred embodiments thereof. Many other variations are possible. For example, although U.S. patent data has been used in the examples, the document system could be applied to other categories of documents. Some embodiments would target specific types of documents. The routines could be implemented in hardware or using various software platforms. Additionally, the system could have additional features, or be used in different countries without departing from the scope and spirit of the novel features of the present invention.

Accordingly, the scope of the invention should be determined not by the illustrated embodiments, but by the appended claims and their legal equivalents.

The invention claimed is:

1. A non-transitory computer readable medium encoded with program instructions which are executed by a computer to provide a method of generating internal citations for a formatted document, the instructions comprising the steps of:
   a) obtaining graphic representations of each page of the formatted document,
   wherein the formatted document is a patent document,
   b) optically recognizing characters on each page of the formatted document, and determining the position of the characters on each page,
   c) obtaining a separate and distinct text version of the formatted document from a source separate and distinct from the formatted document,
   d) parsing text from the text version, the parsed text being separate and distinct from the recognized characters,
   e) correlating the recognized characters with the parsed text to determine an internal citation for each sentence, wherein the internal citation identifies the document and a citation location inside the document where the corresponding sentence is found, and
   f) creating a data structure storing data determined in the correlating step,
   wherein the citation location comprises:
      i) an internal citation column number; and
      ii) an internal citation line number.

2. The computer readable medium of claim 1 further comprising a step of:
   using the parsed text to correct the recognized characters, yielding a corrected formatted document.

3. The computer readable medium of claim 1 further comprising a step of:
   attaching the data structure to the formatted document,
   wherein, when a portion of text is copied from the formatted document, a corresponding internal citation is included with the copied portion.

4. The computer readable medium of claim 3 wherein the attaching step yields a searchable annotated formatted document.

5. The computer readable medium of claim 1 wherein the data structure comprises citation start data, comprising a start column number and a start line number.

6. The computer readable medium of claim 5 wherein the data structure comprises citation end data, comprising an end column number and an end line number.

7. The computer readable medium of claim 1 wherein the parsing the text step further includes at least one of the group of:
   a) determining new paragraphs, and
   b) determining paragraph types.

8. The computer readable medium of claim 1 wherein the parsing the text step further includes determining document parts, said document parts each comprising a distinct group of pages, wherein the document parts includes at least one of the group of:
   a) abstract,
   b) drawing,
   c) specification, and
   d) claims.

9. The computer readable medium of claim 1 wherein the parsing the text step further includes determining document sections, said document sections each comprising a distinct group of paragraphs, under one or more headings, wherein the document sections includes at least one of the group of:
   a) field of invention,
   b) background of invention,
   c) summary of invention,
   d) description of drawings, and
   e) description of invention.

10. The computer readable medium of claim 1 wherein the determining the position of the characters substep further includes at least one of the group of:
    a) assembling lines,
    b) allocating lines to columns, and
    c) calculating line numbers.

11. The computer readable medium of claim 1 wherein the correlating step further includes at least one of the group of:
    a) determining column numbers, and
    b) determining line numbers.

12. The computer readable medium of claim 1 wherein the formatted document contains patent drawing figures, and
    wherein the correlating step further includes at least one of the group of:
    a) determining figure numbers in the drawing figures, and
    b) determining figure item numbers in drawings figures.

13. The computer readable medium of claim 1 wherein the correlating step further includes at least one of the group of:
   a) determining patent claim numbers, and
   b) determining patent clause numbers.

14. The computer readable medium of claim 1 further comprising a step of:
   generating a citation document using the correlation data structure.

15. The computer readable medium of claim 1 further comprising a step of:
   generating a concordance report using the correlation data structure, the concordance report comprising rows comprising:
   a) a word or phrase, and
   b) one or more internal citations, indicating where the word or phrase occurs in the formatted document.

16. A non-transitory computer readable medium encoded with program instructions which are executed by a computer to provide a method of generating internal citations for a formatted document, the instructions comprising the steps of:
   a) obtaining graphic representations of each page of the formatted document,
   wherein the formatted document is a patent document,
   b) optically recognizing characters on each page of the formatted document, and determining the position of the characters on each page,
   c) obtaining a separate and distinct text version of the formatted document,
   d) parsing text from the text version, the parsed text being separate and distinct from the recognized characters,
   e) correlating the recognized characters with the parsed text to determine an internal citation for each sentence, wherein the internal citation identifies the document and a citation location inside the document where the corresponding sentence is found,
   f) creating a data structure storing data determined in the correlating step,
   wherein the data structure comprises:
   g) internal citation page number data or internal citation paragraph number data and
   h) internal citation sentence number data.

17. A non-transitory computer readable medium encoded with program instructions which are executed by a computer to provide a method of generating internal citations for a formatted document, the instructions comprising the steps of:
   a) obtaining graphic representations of each page of the formatted document,
   wherein the formatted document is a patent document,
   b) optically recognizing characters on each page of the formatted document, and determining the position of the characters on each page,
   c) obtaining a separate and distinct text version of the formatted document,
   d) parsing text from the text version, the parsed text being separate and distinct from the recognized characters,
   e) correlating the recognized characters with the parsed text to determine an internal citation for each sentence, wherein the internal citation identifies the document and a citation location inside the document where the corresponding sentence is found,
   f) creating a data structure storing data determined in the correlating step, and
   g) generating a patent corpus report using the correlation data structure, the patent corpus report comprising rows comprising:
   i) prior context,
   ii) a word or phrase,
   iii) subsequent context, and
   iv) an internal citation.

18. The computer readable medium of claim 17 wherein the patent corpus report is based on a single word root.

19. The computer readable medium of claim 17 wherein the patent corpus report is based on one of the group of:
   a) a phrase, and
   b) a set of related words.

20. The computer readable medium of claim 17, wherein at least one citation location comprises:
   i) an internal citation column number; and
   ii) an internal citation line number.

* * * * *